S. H. STRONG.
Potato-Planter.
No. 18,827.
Patented Dec. 8, 1857.
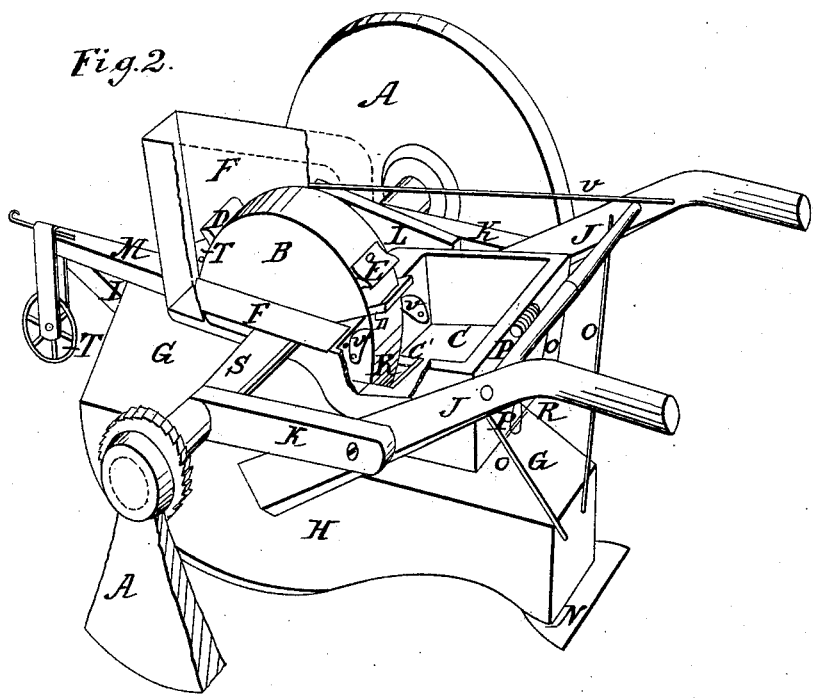
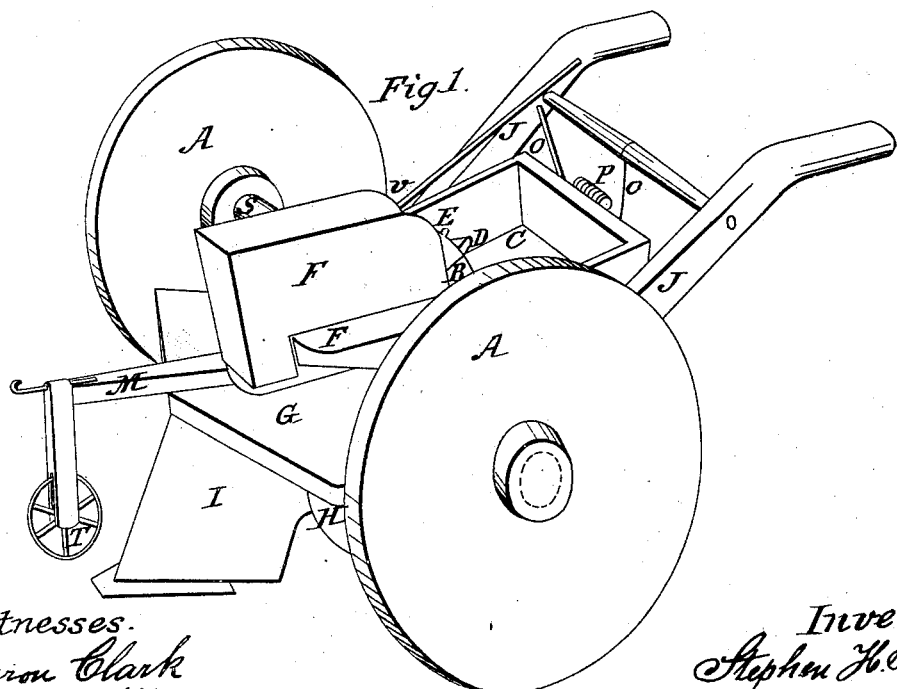
Witnesses.
Aaron Clark
Henry White
Inventor
Stephen H. Strong

UNITED STATES PATENT OFFICE.

STEPHEN H. STRONG, OF BRUNSWICK, OHIO.

IMPROVEMENT IN POTATO-PLANTERS.

Specification forming part of Letters Patent No. 18,827, dated December 8, 1857.

*To all whom it may concern:*

Be it known that I, STEPHEN H. STRONG, of the town of Brunswick, Medina county, State of Ohio, have invented a new Potato-Planter; and I do hereby declare that the following is a full, clear, and exact description of the construction and operation of the same.

Figure 1 is a front view in perspective; Fig. 2, a top view in perspective.

A represents the transport-wheels, one of which in Fig. 2 is partly broken away. The wheels must be of such size as may be required for the height of bucket-wheel and plow, &c. S, the axle; B, the bucket-wheel; D, the buckets, which are to be adjustable and of such number as may be required; E, checks in front of buckets to prevent the seed from rolling forward, and over which it will fall into the furrow; G, a platform, to which are attached plow I, which has mold-boards alike on each side, the inverted mold-boards H H for filling the furrows, and the leveling-scraper N; J, the handles, which are attached firmly to the platform G; K, arms connecting the axle S to the handles with loose joints, so as to permit the transport-wheels to rise or fall in passing over the inequalities of the ground without disturbing the plow, &c.; C, the hopper; C', the feed-box as seen through the broken side of hopper. This must be of sufficient depth to hold one layer of seed (potatoes) below the surface of hopper-bottom; R, a slide which forms the bottom of seed-box. This slide has a head-piece on the under side of the front end, and is held firmly in its place by the spring P. V V are chocks to hold and prevent the bucket-wheel from turning back; L, a chock on the axle S to hold the transport-wheels when turning about, and is worked by the lever U; F, guards upon each side and in front of the bucket-wheel, and which in Fig. 2 are partly broken away; O, brace-rods from the back end of platform and hopper, and secured to the handles; T, a gage-wheel made to be raised or lowered, by which the depth of the furrow may be regulated; M, the beam to which the power is applied.

Mode of operating: The distance which the seed is to be dropped apart must be measured on the transport-wheels and the buckets adjusted accordingly, and also adjusted as to the quantity of seed, (number of potatoes,) more or less, to be taken up, by setting the buckets in or out, as the case may be. When the planter is moved forward the bucket strikes against the head-piece of slide R, and, forcing it back, passes through the seed-box C', by which it is filled, and as it rises the slide R is forced back by the spring P and the feed-box is again filled from the hopper C, and is ready for the next bucket, the seed being carried over the wheel until it falls over the check E into the furrow, at equal distances apart, falling betwixt the mold-boards of the plow, and is covered by the inverted mold-boards and the leveling-scraper.

What I claim as my invention, and desire to secure by Letters Patent, is—

The seeding-wheel B, armed with adjusting-buckets D and checks E, in combination with the hopper C and sliding bottom R, and operating in the manner and for the purpose set forth.

STEPHEN H. STRONG.

Witnesses:
AARON CLARK,
HENRY WHITE.